US006991008B2

(12) United States Patent
McDonald et al.

(10) Patent No.: US 6,991,008 B2
(45) Date of Patent: Jan. 31, 2006

(54) ROUTER

(75) Inventors: Randy McDonald, Sussex, WI (US); Dale Borchardt, Wind Lake, WI (US); Troy Thorson, Waukesha, WI (US); Jeffrey C. Hessenberger, Neosho, WI (US); Christopher Berg, Milwaukee, WI (US); Jeffrey S. Holly, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 10/831,745

(22) Filed: Apr. 23, 2004

(65) Prior Publication Data

US 2004/0194854 A1 Oct. 7, 2004

Related U.S. Application Data

(60) Division of application No. 10/718,048, filed on Nov. 19, 2003, now Pat. No. 6,951,232, which is a continuation of application No. 09/927,448, filed on Aug. 11, 2001, now Pat. No. 6,725,892.

(60) Provisional application No. 60/224,852, filed on Aug. 11, 2000.

(51) Int. Cl.

| | |
|---|---|
| ***B27C 5/02*** | (2006.01) |
| ***B25H 1/02*** | (2006.01) |
| ***B23C 1/12*** | (2006.01) |

(52) U.S. Cl. ............................ 144/136.95; 144/286.5; 409/182; 409/210; 409/229

(58) Field of Classification Search ........... 144/136.95, 144/154.5, 286.1, 286.5, 287; 409/180–182, 409/206, 218, 209, 210, 229

See application file for complete search history.

(56) References Cited

U.S. PATENT DOCUMENTS

| | | | |
|---|---|---|---|
| 542,568 | A | 7/1895 | Miller |
| 712,843 | A | 11/1902 | Paul |
| 1,586,412 | A | 5/1926 | Curtis |
| 1,820,162 | A | 8/1931 | Salvat |
| 2,504,880 | A | 4/1950 | Rittenhouse |
| 2,513,894 | A | 7/1950 | Rogers |
| 2,630,152 | A | 3/1953 | Turnbull |
| 2,799,305 | A | 7/1957 | Groehn |
| 2,943,654 | A | 7/1960 | Emmons |
| 3,289,718 | A | 12/1966 | Willis |

(Continued)

FOREIGN PATENT DOCUMENTS

| | | | |
|---|---|---|---|
| CA | 2314653 | * | 1/2005 |

(Continued)

*Primary Examiner*—Derris H. Banks
*Assistant Examiner*—Shelley Self
(74) *Attorney, Agent, or Firm*—Michael Best & Friedrich LLP

(57) ABSTRACT

A power tool, such as, for example a router. In some aspects, a router includes a base, a housing and a hand grip attachable to one of the base and the housing, and the hand grip may be contoured to fit a hand of an operator and may be at least partially formed of an elastomeric material. In some aspects, a router includes a housing and a hand grip connected to the housing. In some aspects, a router is operable above a workpiece and under a table. In some aspects, a router includes a base, a motor housing and an adjustment mechanism supported by at least one of the base and the motor housing for adjusting the position of the motor housing relative to the base. In some aspects, a case for a router includes a base plate operable to support a router with a bit attached to the router.

32 Claims, 16 Drawing Sheets

U.S. PATENT DOCUMENTS

| | | | |
|---|---|---|---|
| 3,363,510 | A | 1/1968 | Burrows et al. |
| 3,451,133 | A | 6/1969 | Hathaway et al. |
| 3,466,973 | A | 9/1969 | Rees |
| 3,481,453 | A | 12/1969 | Shreve III, et al. |
| 3,487,747 | A | 1/1970 | Burrows et al. |
| 3,489,191 | A | 1/1970 | Blevins |
| 3,490,502 | A | 1/1970 | Willis |
| 3,494,395 | A | 2/1970 | Graham |
| 3,512,740 | A | 5/1970 | Podwalny |
| 3,587,387 | A | 6/1971 | Burrows |
| 3,710,833 | A | 1/1973 | Hammer et al. |
| 3,767,876 | A | 10/1973 | Batson |
| 3,786,846 | A | 1/1974 | Mehring |
| 3,827,820 | A | 8/1974 | Hoffman |
| 3,905,273 | A | 9/1975 | Shook |
| 4,051,880 | A | 10/1977 | Hestily |
| 4,085,552 | A | 4/1978 | Horine et al. |
| 4,108,225 | A | 8/1978 | Hestily |
| 4,143,691 | A | 3/1979 | Robinson |
| 4,239,428 | A | 12/1980 | Berzina |
| 4,252,164 | A | 2/1981 | Norlander |
| D262,185 | S | 12/1981 | Huber et al. |
| 4,319,860 | A | 3/1982 | Beares |
| D267,492 | S | 1/1983 | Schieber |
| 4,410,022 | A | 10/1983 | Peterson |
| 4,455,023 | A | 6/1984 | Saloom |
| 4,461,330 | A | 7/1984 | Judkins |
| 4,510,404 | A | 4/1985 | Barrett et al. |
| 4,513,381 | A | 4/1985 | Houser, Jr. et al. |
| 4,537,234 | A | 8/1985 | Onsrud |
| D281,218 | S | 11/1985 | Barrett et al. |
| 4,562,872 | A | 1/1986 | Fushiya et al. |
| 4,593,466 | A | 6/1986 | O'Brien |
| D286,132 | S | 10/1986 | Yamamoto |
| 4,615,654 | A | 10/1986 | Shaw |
| 4,636,961 | A | 1/1987 | Bauer |
| 4,652,191 | A | 3/1987 | Bernier |
| 4,679,606 | A | 7/1987 | Bassett |
| 4,718,468 | A | 1/1988 | Cowman |
| 4,738,571 | A | 4/1988 | Olson et al. |
| 4,770,573 | A | 9/1988 | Monobe |
| 4,776,374 | A | 10/1988 | Charlebois |
| D300,501 | S | 4/1989 | Zurwelle |
| 4,830,074 | A | 5/1989 | Lundblom |
| 4,872,550 | A | 10/1989 | Stranges |
| D304,543 | S | 11/1989 | Somers et al. |
| 4,919,176 | A | 4/1990 | Gachet et al. |
| 4,924,571 | A | 5/1990 | Albertson |
| 4,938,642 | A | 7/1990 | Imahashi et al. |
| 5,012,582 | A | 5/1991 | Bristol et al. |
| 5,029,706 | A | 7/1991 | McCracken |
| 5,062,460 | A | 11/1991 | DeLine |
| 5,074,724 | A | 12/1991 | McCracken |
| 5,078,557 | A | 1/1992 | McCracken |
| D323,935 | S | 2/1992 | Ward |
| 5,088,865 | A | 2/1992 | Beth et al. |
| D326,597 | S | 6/1992 | Lee |
| 5,117,879 | A | 6/1992 | Payne |
| 5,139,061 | A | 8/1992 | Neilson |
| 5,181,813 | A | 1/1993 | McCracken |
| 5,188,492 | A | 2/1993 | McCracken |
| 5,191,921 | A | 3/1993 | McCurry |
| D337,501 | S | 7/1993 | Witt |
| D340,174 | S | 10/1993 | Hoshino et al. |
| D341,305 | S | 11/1993 | Svetlik |
| 5,265,657 | A | 11/1993 | Matsumoto et al. |
| 5,273,089 | A | 12/1993 | Fuchs et al. |
| 5,289,861 | A | 3/1994 | Hedrick |
| 5,310,296 | A | 5/1994 | McCurry |
| D349,637 | S | 8/1994 | Hoshino et al. |
| 5,347,684 | A | 9/1994 | Jackson |
| 5,353,474 | A | 10/1994 | Good et al. |
| D352,048 | S | 11/1994 | Goebel |
| 5,361,851 | A | 11/1994 | Fox |
| 5,368,424 | A | 11/1994 | Bettenhausen |
| 5,375,636 | A | 12/1994 | Bosten et al. |
| 5,429,235 | A | 7/1995 | Chen |
| 5,445,479 | A | 8/1995 | Hillinger |
| 5,452,751 | A | 9/1995 | Engler, III et al. |
| 5,469,601 | A | 11/1995 | Jackson |
| 5,503,203 | A | 4/1996 | Stornetta |
| 5,511,445 | A | 4/1996 | Hildebrandt |
| 5,533,843 | A | 7/1996 | Chung |
| 5,584,620 | A | 12/1996 | Blickhan et al. |
| 5,590,989 | A | 1/1997 | Mulvihill |
| 5,598,892 | A | 2/1997 | Fox |
| 5,632,578 | A | 5/1997 | McCurry et al. |
| 5,640,741 | A | 6/1997 | Yano |
| 5,662,440 | A | 9/1997 | Kikuchi et al. |
| 5,671,789 | A | 9/1997 | Stolzer et al. |
| 5,678,965 | A | 10/1997 | Strick |
| 5,725,036 | A | 3/1998 | Walter |
| 5,725,038 | A | 3/1998 | Tucker et al. |
| 5,758,702 | A | 6/1998 | Adams |
| 5,803,684 | A | 9/1998 | Wang |
| 5,853,273 | A | 12/1998 | Coffey |
| 5,853,274 | A | 12/1998 | Coffey et al. |
| D407,617 | S | 4/1999 | Cooper et al. |
| 5,902,080 | A | 5/1999 | Kopras |
| D410,934 | S | 6/1999 | Etter |
| 5,909,987 | A | 6/1999 | Coffey et al. |
| 5,918,652 | A | 7/1999 | Tucker |
| D416,460 | S | 11/1999 | Bosten et al. |
| 5,988,241 | A | 11/1999 | Bosten et al. |
| 5,993,124 | A | 11/1999 | Cooper et al. |
| 5,997,225 | A | 12/1999 | Young et al. |
| 5,998,897 | A | 12/1999 | Bosten et al. |
| 6,065,912 | A | 5/2000 | Bosten et al. |
| 6,079,915 | A | 6/2000 | Bosten et al. |
| 6,113,323 | A | 9/2000 | Bosten et al. |
| 6,139,229 | A | 10/2000 | Bosten et al. |
| D435,414 | S | 12/2000 | Etter et al. |
| 6,158,930 | A | 12/2000 | Etter |
| 6,182,723 | B1 | 2/2001 | Bosten et al. |
| 6,226,877 | B1 | 5/2001 | Ono |
| 6,250,859 | B1 | 6/2001 | Bosten et al. |
| 6,261,036 | B1 | 7/2001 | Bosten et al. |
| 6,267,238 | B1 | 7/2001 | Miller et al. |
| 6,308,378 | B1 | 10/2001 | Mooty et al. |
| D450,230 | S | 11/2001 | Long et al. |
| 6,318,936 | B1 | 11/2001 | McFarlin, Jr. et al. |
| D461,389 | S | 8/2002 | Hsiao |
| D463,238 | S | 9/2002 | Schoen et al. |
| 6,488,455 | B1 | 12/2002 | Staebler et al. |
| D473,439 | S | 4/2003 | Grant et al. |
| 2002/0043296 | A1 | 4/2002 | Daniels et al. |
| 2002/0164223 | A1 | 11/2002 | Ryan et al. |

FOREIGN PATENT DOCUMENTS

| | | |
|---|---|---|
| DE | 41 19 325 | 12/1992 |
| GB | 1 452 163 | 10/1976 |
| GB | 2 062 361 | 5/1981 |

* cited by examiner

ROUTER

RELATED APPLICATIONS

This application is a divisional of U.S. application Ser. No. 10/718,048 filed Nov. 19, 2003, now U.S. Pat. No. 6,951,232, which is a continuation of U.S. application Ser. No. 09/927,448 filed Aug. 11, 2001, now U.S. Pat. No. 6,725,892, which claims the benefit of U.S. Provisional Application Ser. No. 60/224,852 filed Aug. 11, 2000.

FIELD OF THE INVENTION

The invention relates to hand-held power tools and, more particularly, to routers.

BACKGROUND OF THE INVENTION

A router generally includes a base for supporting the router on a workpiece surface, a housing supported by the base and movable relative to the base, and a motor supported by the housing and operable to drive a tool element. In a fixed-base router, the housing is fixed or locked in a position relative to the base once the depth of cut of the tool element is set. In a plunge router, the housing is movable relative to the housing to the desired depth of cut so that the tool element "plunges" into the workpiece.

SUMMARY OF THE INVENTION

Typically, existing routers include one or more hand grips spaced apart on opposite sides of the housing or the base to control movement of the router on the workpiece. Many operators, however, grip a router by the housing or the base. A typical router is manufactured from hard plastic or metal, which provide minimal friction and lack of comfort to the operator.

The apparatus and method of the present invention alleviates, in aspects of the invention, one or more problems relating to, among other things, gripping of the router, depth adjustment, clamping of the housing relative to the base, operation of the router in an inverted position and storage of the router.

In some aspects, the invention provides a hand grip connected to the housing. In some aspects, the invention provides a router operable above a workpiece and under a table. In some aspects, the invention provides a case for a router including a base plate operable to support a router with a bit attached.

In some aspects, the present invention provides a router including a hand grip attachable to one of the base and the housing, and the hand grip may be contoured to fit a hand of an operator and may be at least partially formed of an elastomeric material.

In some aspects, the router includes a fixing assembly for fixing the housing in a position relative to the base, the fixing assembly including a clamping member for applying a clamping force to the housing to fix the housing in a position relative to the base, and an actuator for moving the clamping member between a clamping position, in which the clamping member applies the clamping force to the housing, and a release position, in which the clamping force is not applied to the housing and the housing is movable relative to the base. Preferably, the actuator includes a plurality of cam members which are engageable to move the clamping member to the clamping position.

In some aspects, the router includes an adjustment mechanism for adjusting the position of the housing relative to the base. Preferably, the adjustment mechanism includes a coarse adjustment assembly, for making relatively large changes in the position of the housing relative to the base, and a fine adjustment assembly, for making relatively small changes to the position of the housing relative to the base.

In some aspects, the invention provides a router that is operable under a table and includes a housing, a base and an adjustment mechanism for adjusting the position of the housing relative to the base when the router is under the table.

In some aspects, the invention provides a case for a router including a base plate operable to support the router with a bit attached in the case and on a work surface.

Independent features and independent advantages of the invention will become apparent to those skilled in the art upon review of the following detailed description, claims, and drawings.

Figure 1:
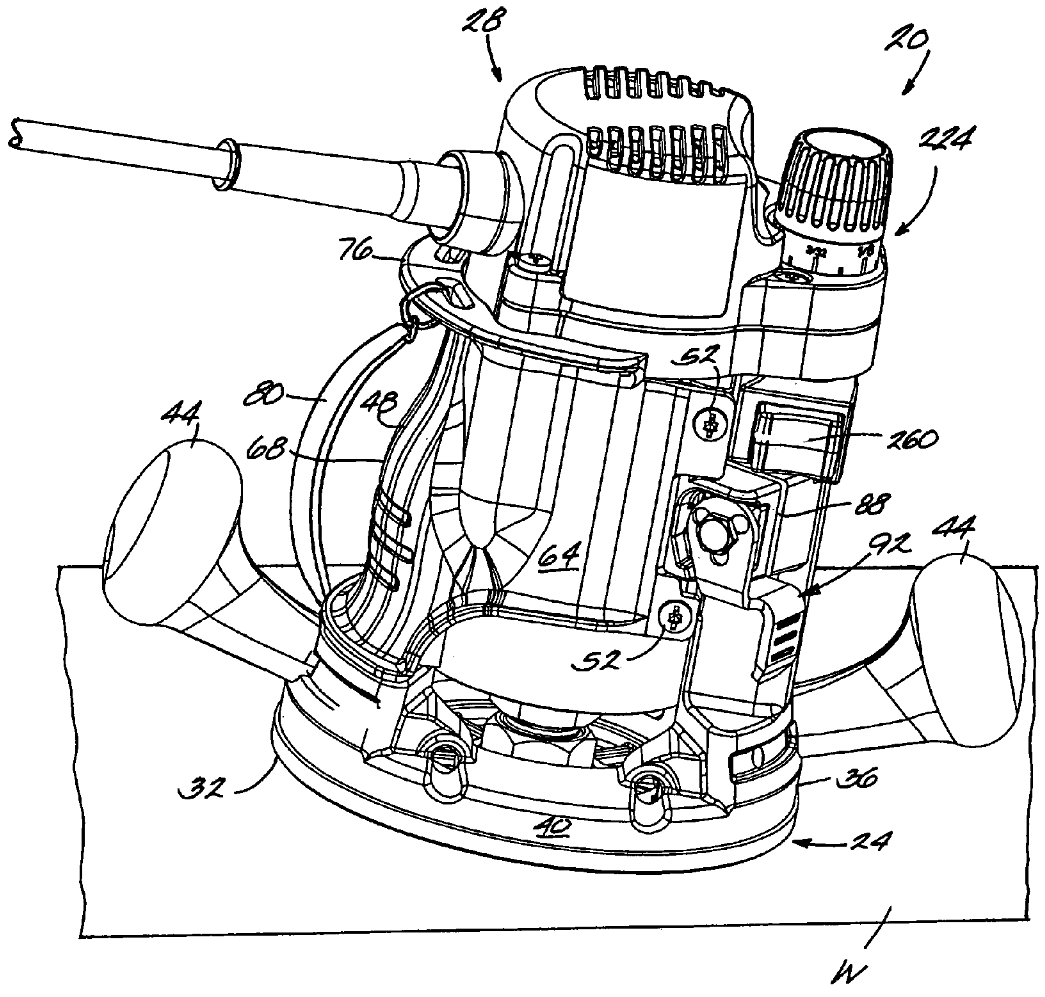
FIG. 1 is a perspective view of a router embodying aspects of the invention.

Before at least one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION

A hand-held router 20 embodying aspects of the invention is illustrated in FIG. 1. The router 20 includes a base 24 and a motor housing 28 movably supported by the base 24. The housing 28 supports (see FIG. 12) a motor 30 operable to drive a tool element (not shown) to cut a workpiece W. In the illustrated construction, the router 20 is a fixed-base router. However, in other constructions (not shown) and for aspects of the invention, the router 20 may be a plunge router.

Figure 2:
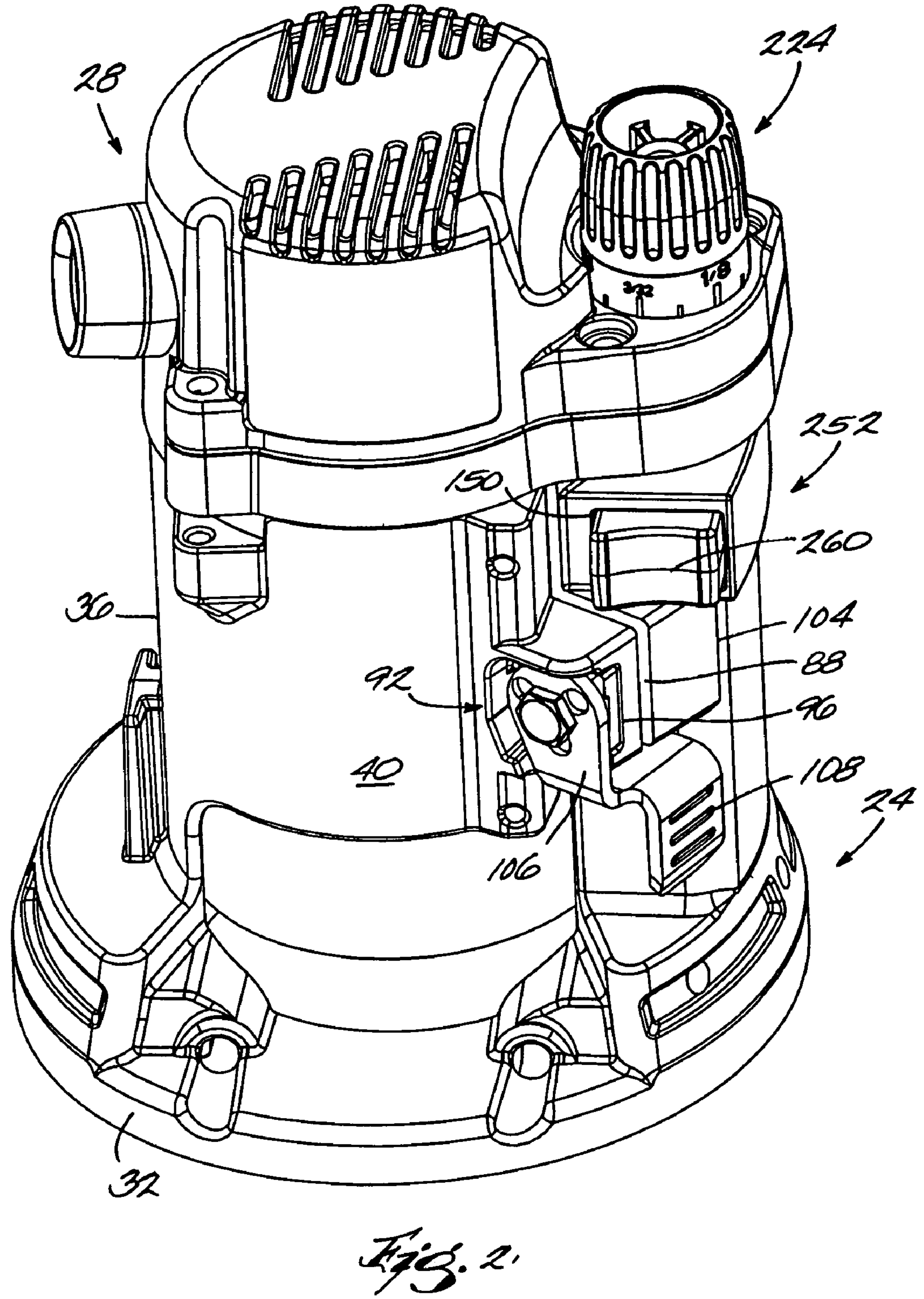
FIG. 2 is a perspective view of the router shown in FIG. 1 with portions removed.
Figure 3:
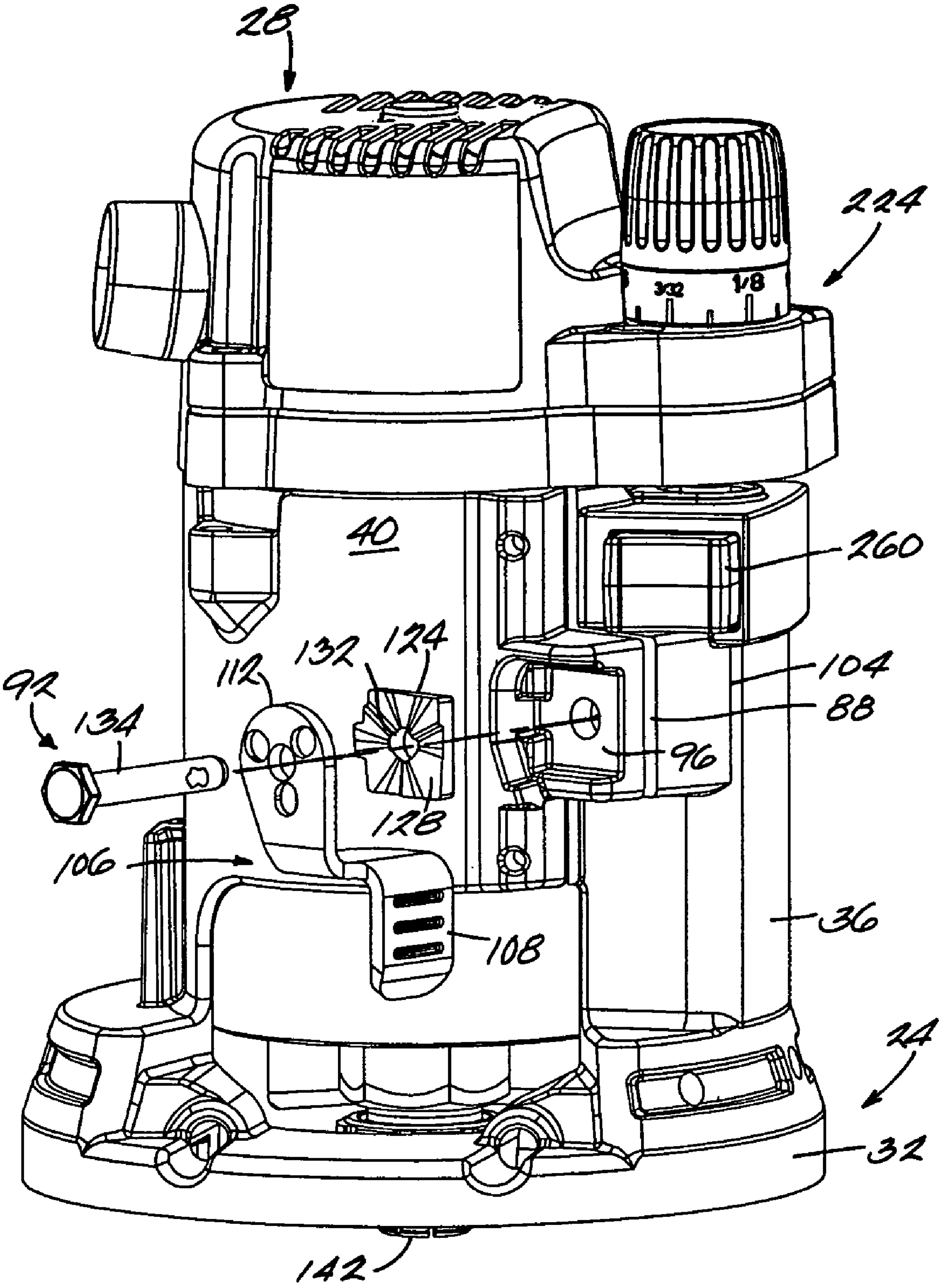
FIG. 3 is a perspective view of the router shown in FIG. 2 and illustrating an exploded view of a clamping mechanism.

As shown in FIGS. 1–3, the base 24 includes a sub base or base plate 32 designed to interface with a work surface, such as the surface of the workpiece W. The base 24 also includes a generally cylindrical annular sleeve 36 extending upwardly from the base plate 32. The sleeve 36 is preferably fastened to, but may be formed integrally with the base plate 32 and has a generally cylindrical outer surface 40.

A pair of knob-like handles 44 removably mountable on the base 24 on opposite sides of the sleeve 36. The handles 44 preferably include soft-grip material covering at least a portion of the handle 44 to provide extra friction for gripping.

Figure 6:
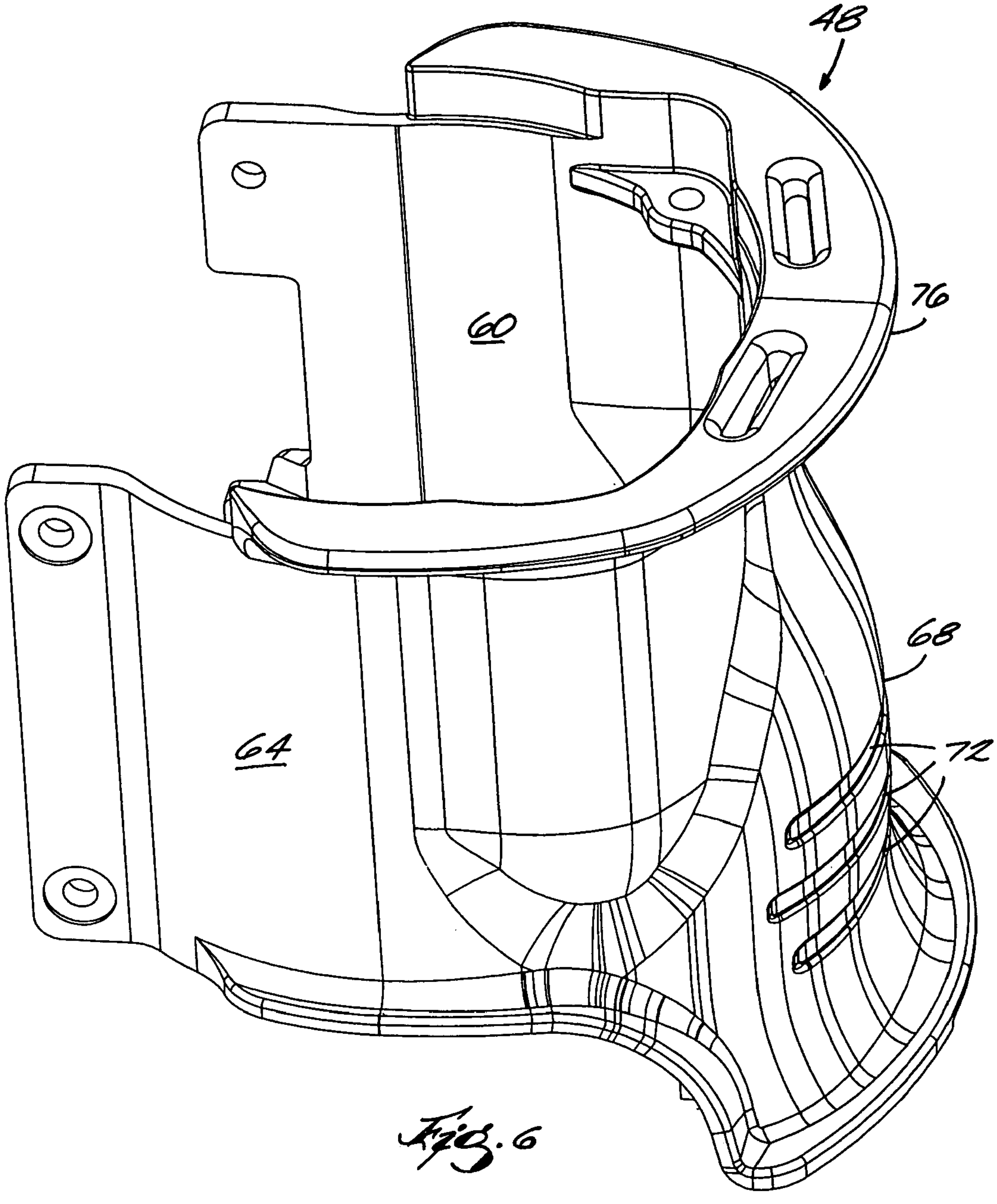
FIG. 6 is a perspective view of the hand grip for the router shown in FIG. 1 and illustrated in a removed condition.

As shown in FIGS. 1 and 6, the router 20 also includes a hand grip 48 attachable to the base 24 of the router 20. The hand grip 48 is attachable to the outer surface 40 of the sleeve 36 by fasteners 52. The hand grip 48 includes an inner surface 60, complementary to and engageable with the outer surface 40 of the sleeve 36, and an outer surface 64, is generally arcuate in horizontal cross-section and surrounds a portion of the sleeve 36. The hand grip 48 subtends an angle around the outer surface of the base 24 of at least 180° and, preferably, of at least 240° or, more preferably, of at least 300°.

The outer surface 64 of the hand grip 48 is preferably contoured to ergonomically match the shape of an operator's hand engaging the hand grip 48 and, thus, gripping the router 20. At least a portion of the hand grip 48 may include a soft grip 68 preferably formed of an elastomeric or tactile material to increase gripping friction. The soft grip 68 may also reduce the amount of vibration passed from the router 20 to an operator. The hand grip 48 may also include a plurality of ribs, ridges, or slots 72 to increase gripping friction.

The hand grip 48 also includes a lip 76 extending radially outward from an upper edge of the hand grip 48. The lip 76 allows an operator to carry a portion of the weight of the router 20 on a side of the operator's hand (not shown) without relying solely on a pinch-type grip. The lip 76 may also prevent upward movement of the operator's hand off of the hand grip 48.

It should be understood that, in other constructions, the hand grip 48 may have a different configuration. Also, the hand grip 48 may be replaced by another hand grip (not shown) having, for example, a different configuration and/or size or formed of a different material, as required by the operating parameters of the router 20 or by the preferences of an operator.

It should also be understood that, in other constructions (not shown), the hand grip 48 may be connected to the housing 28. For example, the hand grip 48 may be connected to an upper portion of the housing 28 and having a portion telescoping over the base 24. In another construction (not shown), the base 24 may be relatively short so that a majority of the housing 28 would be engageable by the operator without interference by the base 24. A separate support arrangement may provide support between the base 24 and the housing 28 without interfering with the hand grip 48 connected to the housing 28. Such constructions may be provided for a plunge-type router.

A hand strap 80 may be provided to assist an operator in gripping and controlling the router 20. The hand strap 80 passes over the back of the operator's hand and, in the illustrated construction, is made of a hook and loop fastener to allow an operator to adjust the fit of the hand strap 80. The hand strap 80 is attached to the base 24 on one end and to the lip 76 of the hand grip 48 on the other end. In other constructions (not shown), the hand strap 80 may be connected to the router 20 at other suitable points.

The sleeve 36 of the base 24 also has (see FIG. 12) an inner surface 84 which may be slightly tapered outward in an upward direction. The sleeve 36 is somewhat resilient and (see FIGS. 2–3) is open on one side at a vertical seam 88. As a result, the inner diameter of the sleeve 36 may be increased or decreased by opening or closing, respectively, the seam 88. The resilience of the sleeve 36 results in the seam 88 being partially open when no force is applied to close the seam 88.

As shown in FIGS. 2–3 and for some aspects of the invention, the router 20 is a fixed-base router and also includes a clamp mechanism 92 to control the opening and closing of the seam 88. When the seam 88 is generally closed, the base 24 is in a clamped position, in which the position of the housing 28 relative to the base 24 is fixed. When the seam 88 is open, the base 24 is in a released position, in which the housing 28 is movable relative to the base 24. The clamp mechanism 92 includes a clamp pocket or receptacle 96 formed on the sleeve 36 on one side of the seam 88. The clamp receptacle 96 has an aperture therethrough. The clamp mechanism 92 also includes a clamp-receiving block 104 formed on the sleeve 36 on the other side of the seam 88. The clamp-receiving block 104 includes a blind recess therein (not shown).

Figure 4:
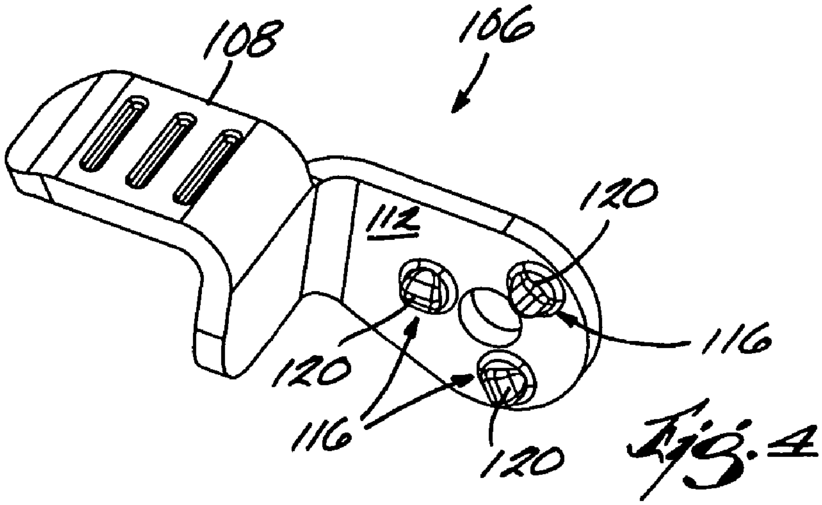
FIG. 4 is a enlarged perspective view of an actuator shown in FIG. 3.
Figure 5:
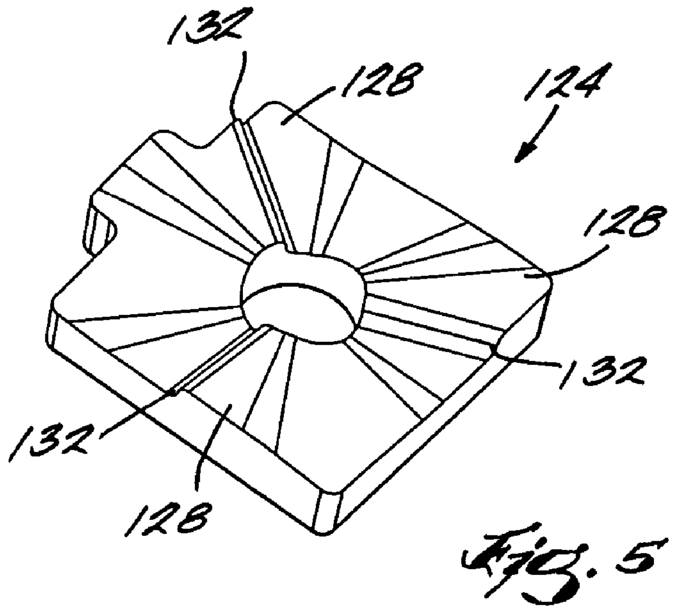
FIG. 5 is a enlarged perspective view of a cam block shown in FIG. 3.

As shown in FIGS. 3–4, the clamp mechanism 92 also includes an actuator or clamp handle 106 including a gripping portion 108 and a cam portion 112. A plurality of cam members 116 are affixed to or formed on the inner face of the cam portion 112, and each cam member 116 has a cam surface 120. As shown in FIGS. 3 and 5, the clamp mechanism 92 also includes a generally square cam block 124 received in the clamp receptacle 96. A plurality of cam members 128 having cam surfaces 132 are formed on the outer surface of the cam block 124.

As shown in FIGS. 1–3, a clamping pin 134 connects the components of the clamp mechanism 92. The pin 134 extends through the cam portion 112 of the clamp handle 106, through the cam block 124, through the clamp receptacle 96, and into a recess (not shown) in the clamp-receiving block 104. The pin 134 is anchored within the recess in the clamp-receiving block 104.

The clamp handle 106 can rotate about the pin 134, but the cam block 124 is restricted from rotation by the clamp receptacle 96. As the clamp handle 106 is rotated about the pin 134, the cam surfaces 120 of the cam members 116 interact with the cam surfaces 132 of the cam members 128.

When the seam 88 is open, the clamp handle 106 is in a generally horizontal orientation, and the cam members 116 of the clamp handle 106 are radially displaced from the cam members 128 of the cam block 124. In such a position, the cam members 116 generally alternate with the cam members 128 allowing the seam 88 to be open. When the seam 88 is open, the clamping force applied by the base 24 to the housing 28 is reduced so that the housing 28 is movable relative to the base 24.

To close the seam 88, the clamp handle 106 is rotated into a generally vertical position. As the handle 106 is rotated, the cam surfaces 120 interact with the cam surfaces 132, forcing the cam members 116 and the cam members 128 into radial alignment, increasing the distance between the clamp handle 106 and the cam block 124. Because the pin 134 is anchored in the clamp-receiving block 104, this increase in distance is taken up by the seam 88, forcing the clamp receptacle 96 closer to the clamp-receiving block 104 and closing the seam 88. When the seam 88 is closed, the clamping force is increased to fix the housing 28 in a position relative to the base 24.

Figure 12:
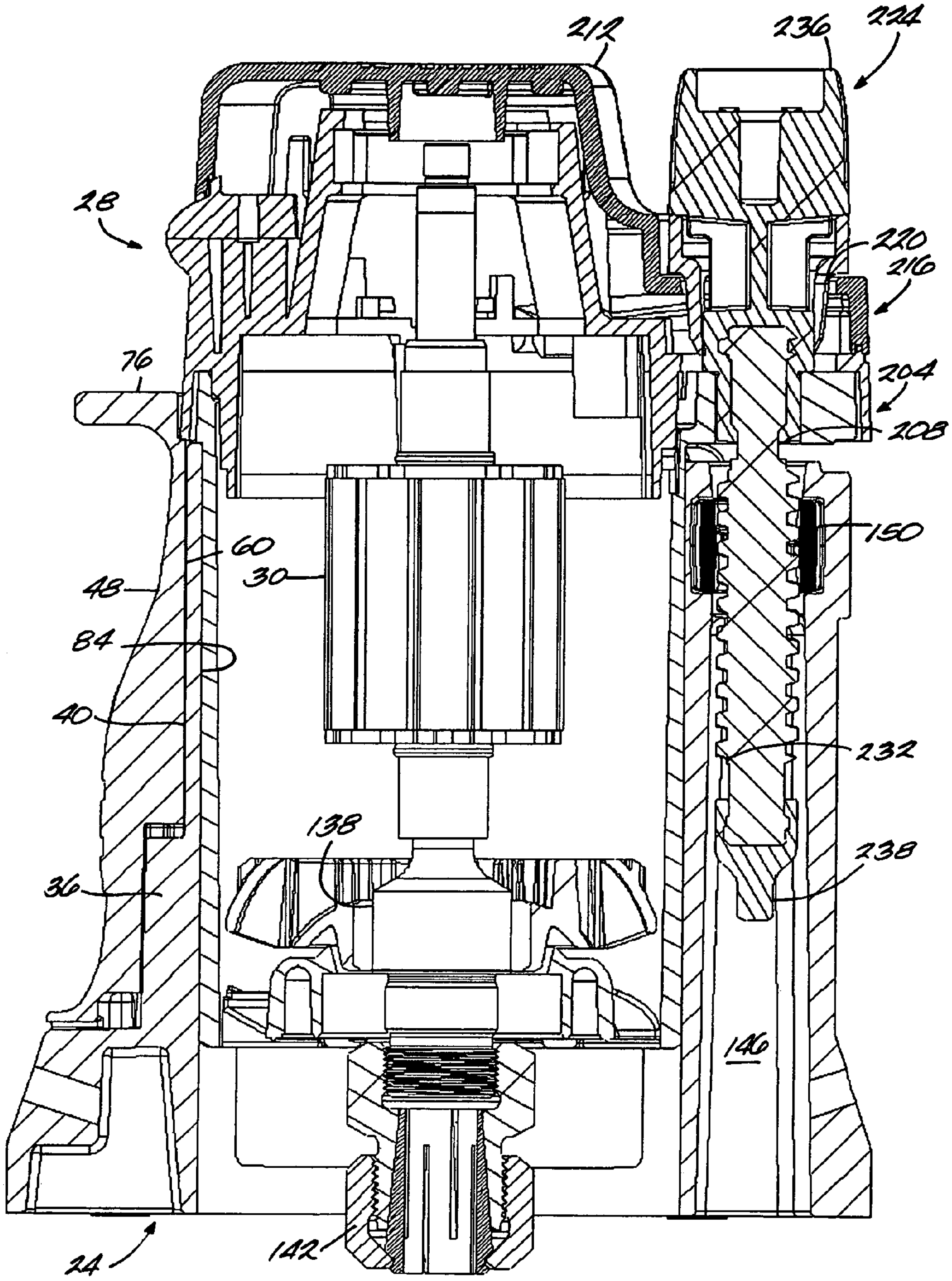
FIG. 12 is a partial cross-sectional view of the router taken generally along line 12—12 in FIG. 11.

As shown in FIGS. 2 and 12, the housing 28 is generally vertically oriented and has a generally cylindrical outer surface. The housing 28 supports the motor 30 and associated components. The motor 30 includes a shaft 138, and a tool holder, such as a collet 142, is connected to or formed with the shaft 138. The tool element is supported by the collet 142.

The housing 28 is arranged to fit within the sleeve 36 and to be vertically movable relative to the sleeve 36. Closing the seam 88 using the clamp mechanism 92, as described above, causes the inner surface 44 of the sleeve 36 to engage the outer surface of the housing 28 and to restrict the vertical movement of the housing 28. Opening the seam 88 releases the housing 28 and allows the housing 28 to be moved vertically.

Figure 7:
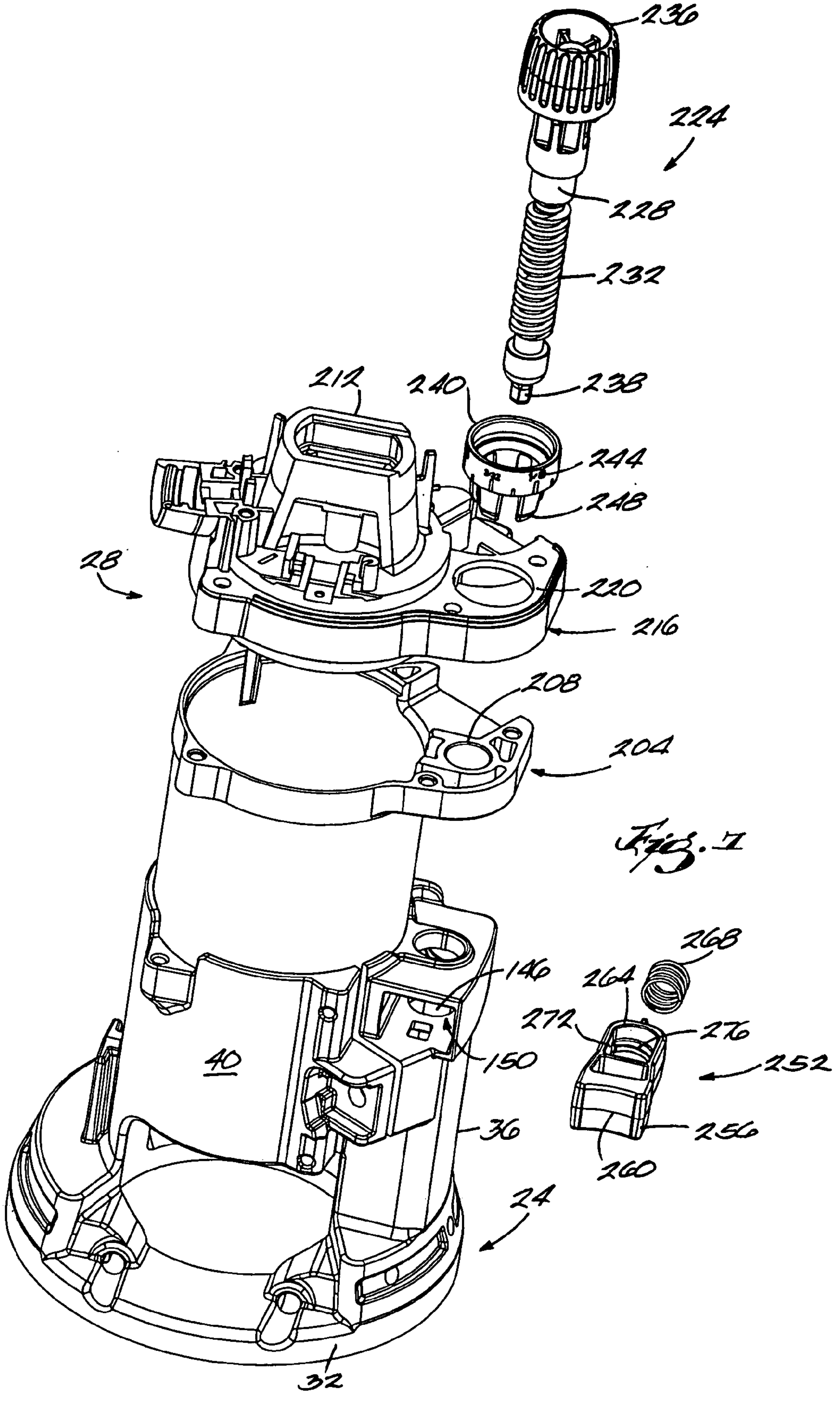
FIG. 7 is an exploded perspective view of the router shown in FIG. 1 and illustrating a depth adjustment mechanism.
Figure 8:
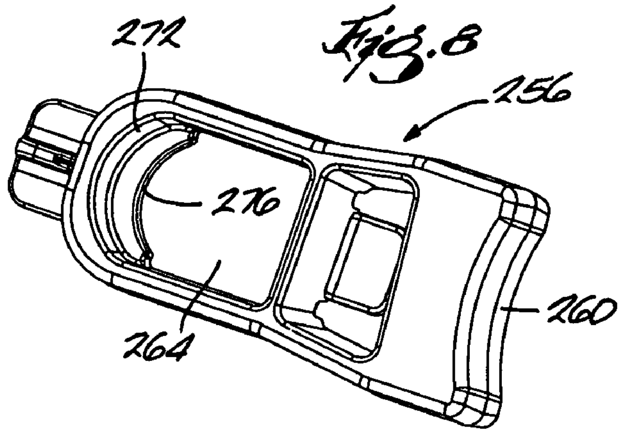
FIG. 8 is a perspective view of a lock frame shown in FIG. 7.
Figure 9:
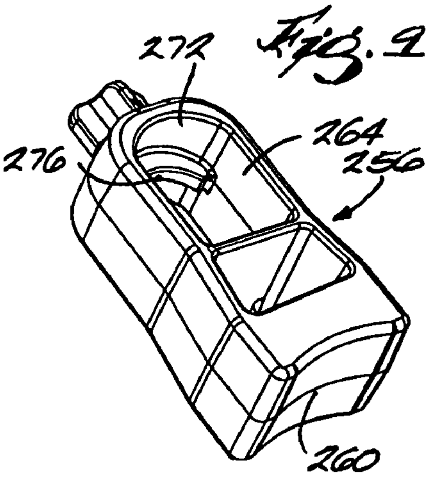
FIG. 9 is another perspective view of the lock frame shown in FIG. 7.
Figure 11:
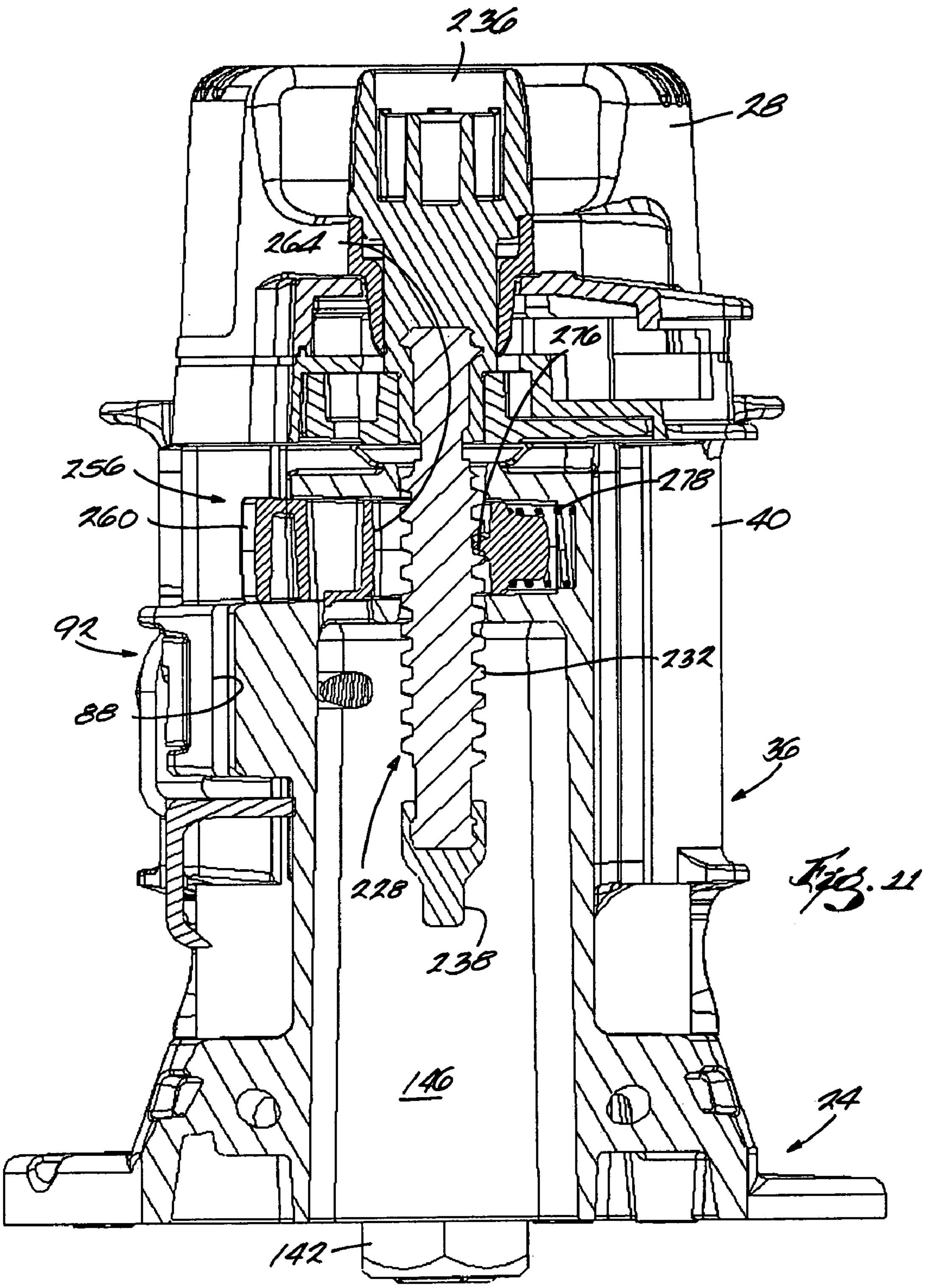
FIG. 11 is a partial cross-sectional view of the router taken generally along line 11—11 in FIG. 1.

As shown in FIGS. 7 and 11–12, the base 24 defines a depth adjustment column 146 adjacent the clamp-receiving block 104 and is preferably formed integrally with the sleeve 36. The depth adjustment column 146 is generally hollow and has (see FIG. 7) an open top end.

As shown in FIGS. 7 and 11, the base 24 also defines a lock mechanism receptacle 150 in the sleeve 36 above the depth adjustment column 146. The lock mechanism receptacle 150 includes an open end and an aperture, and the aperture is vertically aligned with the open top end of the depth adjustment column 146.

As shown in FIGS. 7 and 12, the housing 28 includes a first depth adjustment interface 204 at the upper end of the housing 28. The first depth adjustment interface 204 includes a vertically-oriented aperture 208 therethrough which is vertically aligned with the aperture in the lock mechanism receptacle 150 and the opening 120 in the depth adjustment column 146.

The housing 28 also includes a housing cover 212 having a second depth adjustment interface 216. The second depth adjustment interface 216 includes a vertically-oriented aperture 220 therethrough which is vertically aligned with the aperture 208 in the first depth adjustment interface 204, the aperture 136 in the lock mechanism receptacle 150, and the open end of the depth adjustment column 146.

For some aspects of the invention, the router 20 also includes a depth adjustment mechanism 224 which cooperates with the housing 28 and the base 24 to control the vertical position of the housing 28 relative to the base 24 and to thereby control the depth of cut of the tool element.

Figure 10:
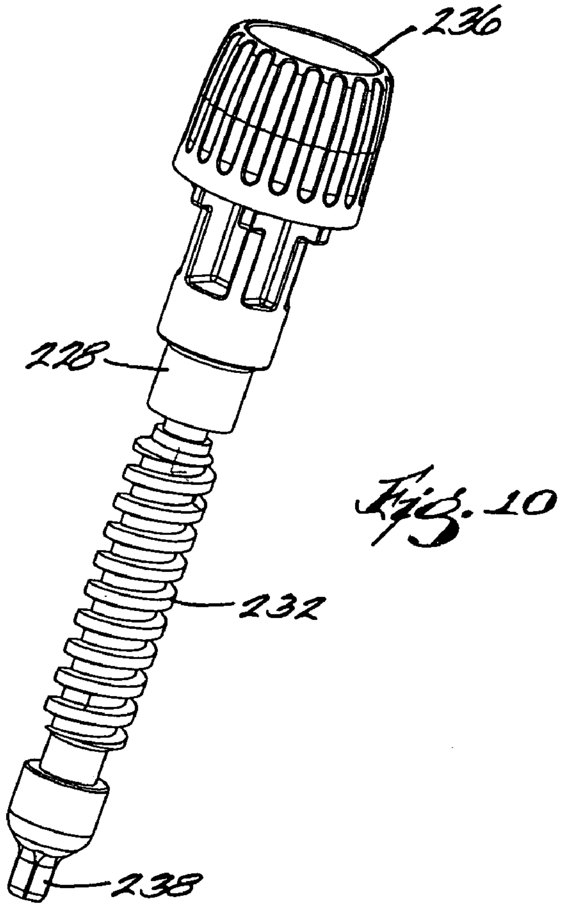
FIG. 10 is a perspective view of a depth adjustment shaft and knob shown in FIG. 7.

As shown in FIGS. 7, 10 and 12, the depth adjustment mechanism 224 includes a depth adjustment shaft 228 which is generally vertically oriented and which has a threaded portion 232 generally housed within the depth adjustment column 146 and the lock mechanism receptacle 150. An adjustment knob 236 is attached to an upper end of the depth adjustment shaft 228. The lower end 238 has a non-circular cross-section, the reason for which is explained below in more detail. The depth adjustment shaft 228 is vertically fixed, but rotatable relative to the housing 28 and moves vertically with the housing 28 relative to the base 24.

A position indication ring 240, imprinted or otherwise marked with position-indicating markings 244, is attached to the second depth adjustment interface 216 by a plurality of resilient fingers 248 integrally formed with the position indication ring 240 so that the position indication ring 240 is fixed with but rotatable relative to the housing 28. The position indication ring 240 surrounds the depth adjustment shaft 228 and is positioned below the adjustment knob 236.

In other constructions (not shown), the position indication ring 240 may be attached to the housing 28 by other suitable structure. For example, the position indication ring 240 may be connected to but rotatable relative to the depth adjustment shaft 228.

As shown in FIGS. 2 and 7–9, the depth adjustment mechanism 224 also includes a lock mechanism 252 enclosed partially within the lock mechanism receptacle 150. The lock mechanism 252 is vertically fixed to the base 24 and is movable in a direction perpendicular to the axis of the depth adjustment column 146. The lock mechanism 252 includes a lock frame 256 having a lock button 260, engageable by the operator to move the lock frame 256, and defining a lock frame aperture 264, through which the threaded portion 232 of the depth adjustment shaft 228 passes.

The lock frame aperture 264 includes an inner surface 272 and at least one locking projection or thread-engaging lug 276 formed on the inner surface 272. The lug 276 is selectively engageable with the threaded portion 232. The lock frame 256 is movable between a thread-engaging position, in which the lug 276 engages the threaded portion 232, and a disengaged position, in which the lug 276 does not engage the threaded portion. The lock frame 256 is biased outwardly to the thread-engaging position by a spring or other biasing member 278.

The depth adjustment mechanism 224 may be used to adjust the vertical position of the housing 28 relative to the base 24 in two modes. For coarse adjustment, the lock button 260 is pushed inward against the biasing member 278, releasing the threaded portion 232 from engagement with the locking projection 276. The depth adjustment shaft 228 and the housing 28 are then free to move translatably in a vertical direction relative to the lock frame 256 and the base 24. Once the desired vertical position of the depth adjustment shaft 228 and the housing 28 is achieved, the lock button 260 is released and the biasing member 278 again biases the lock frame 256 outward to the thread-engaging position and the locking projection 276 engages the threaded portion 232. Once the locking projection 276 is re-engaged with the depth adjustment shaft 228, the depth adjustment shaft 228 and the housing 28 are restricted from free translational movement.

For fine adjustment, the lock mechanism 252 remains engaged with the depth adjustment shaft 228. The adjustment knob 236 is rotated, thus rotating the depth adjustment shaft 228 and the threaded portion 232. The threaded portion 232 rotates relative to the locking projection 276 so that the depth adjustment shaft 228 and the housing 28 move in relatively small increments in a vertical direction relative to the lock frame 256 and the base 24.

In operation, an operator often needs to adjust the depth of cut of the router 20. To adjust the router 20 from a first depth of cut to second depth of cut, the operator first releases the clamp mechanism 92, as described above. This action releases the sleeve 36 from clamping engagement with the housing 28 and allows the housing 28 to be vertically moved relative to the base 24. Coarse adjustment of the position of the housing 28 relative to the base 24 is preferably performed first as described above. Fine adjustment of the position is then performed. Once the desired vertical position is achieved, the operator clamps the clamp mechanism 92, thus clampingly re-engaging the sleeve 36 with the housing 28 and substantially restricting the housing 28 from further movement relative to the base 24. The operator then operates the router 20 by grasping either the two knob-like handles 44 or the hand grip 48, as desired. Additional depth adjustments may be made by repeating this process.

Figure 13:
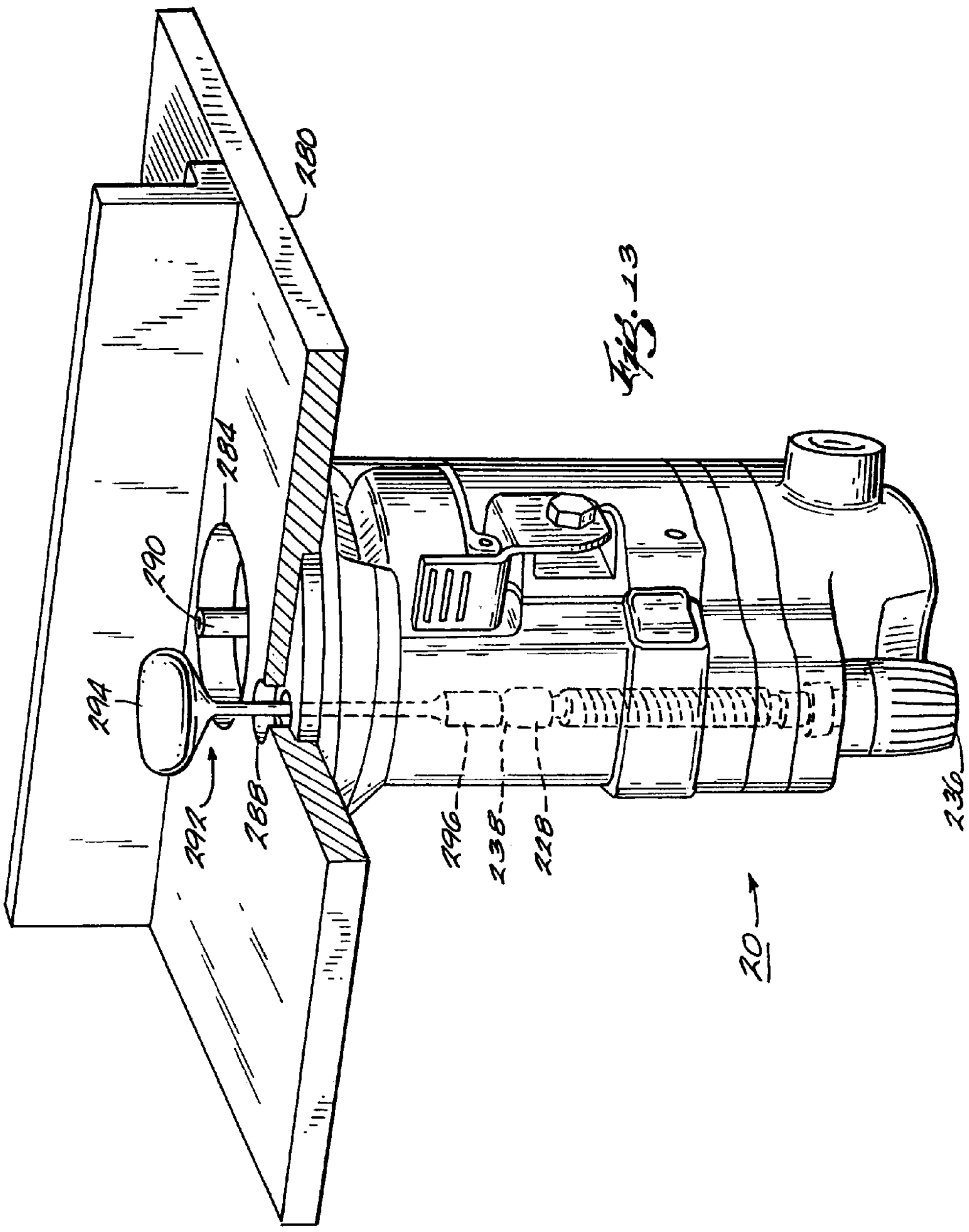
FIG. 13 is a perspective view of the router shown in FIG. 1 and illustrating operation of the router in an inverted position.
Figure 14:
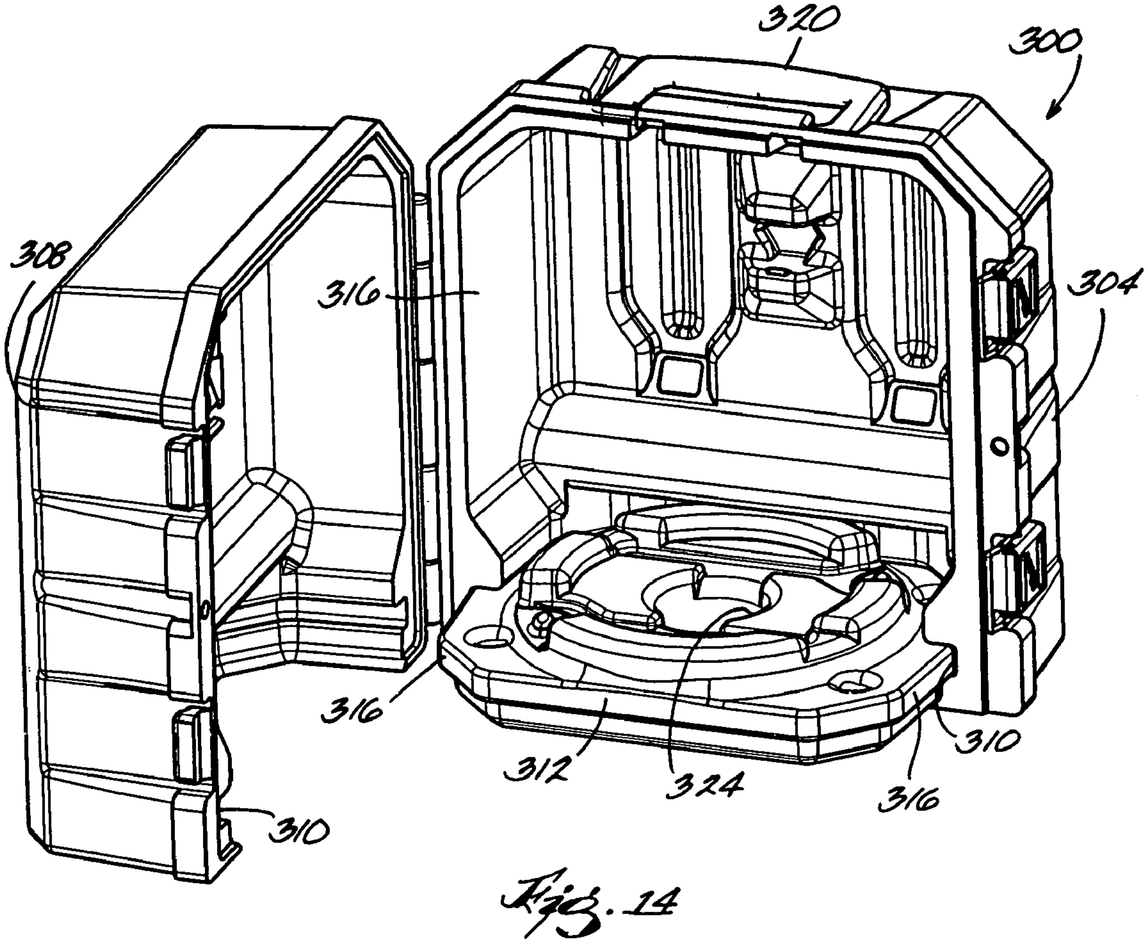
FIG. 14 is a perspective view of a router case.
Figure 15:
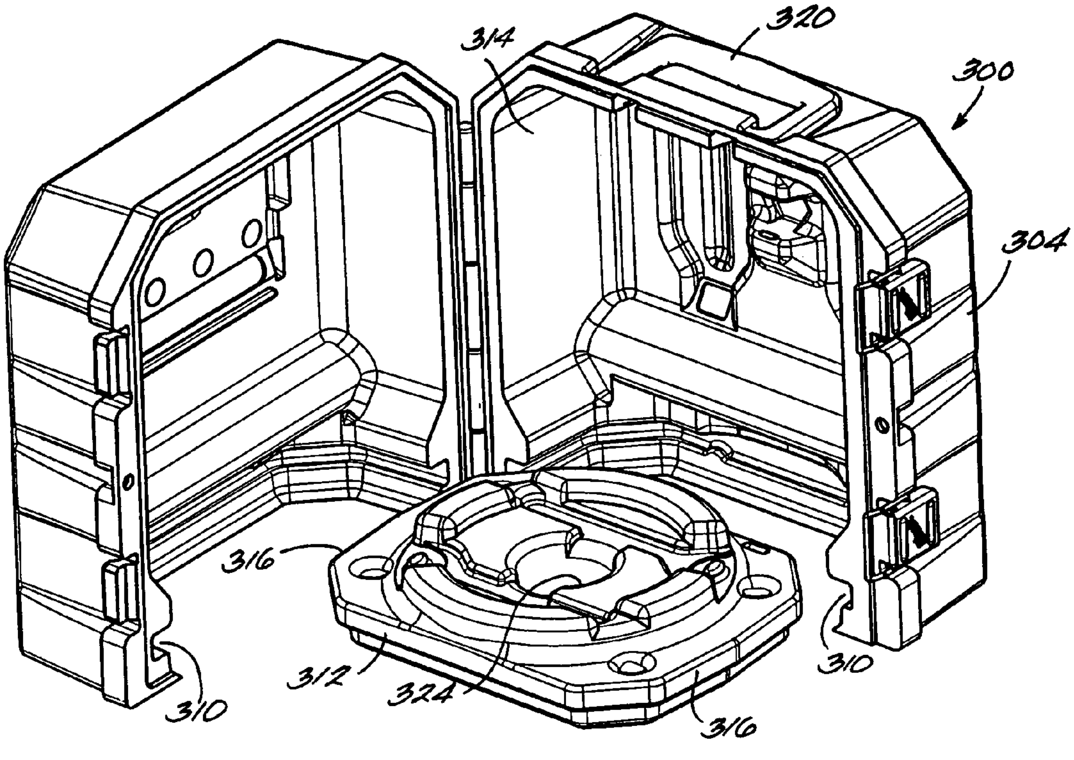
FIG. 15 is a perspective view of router case shown in FIG. 14 and illustrating removal of the base plate.
Figure 16:
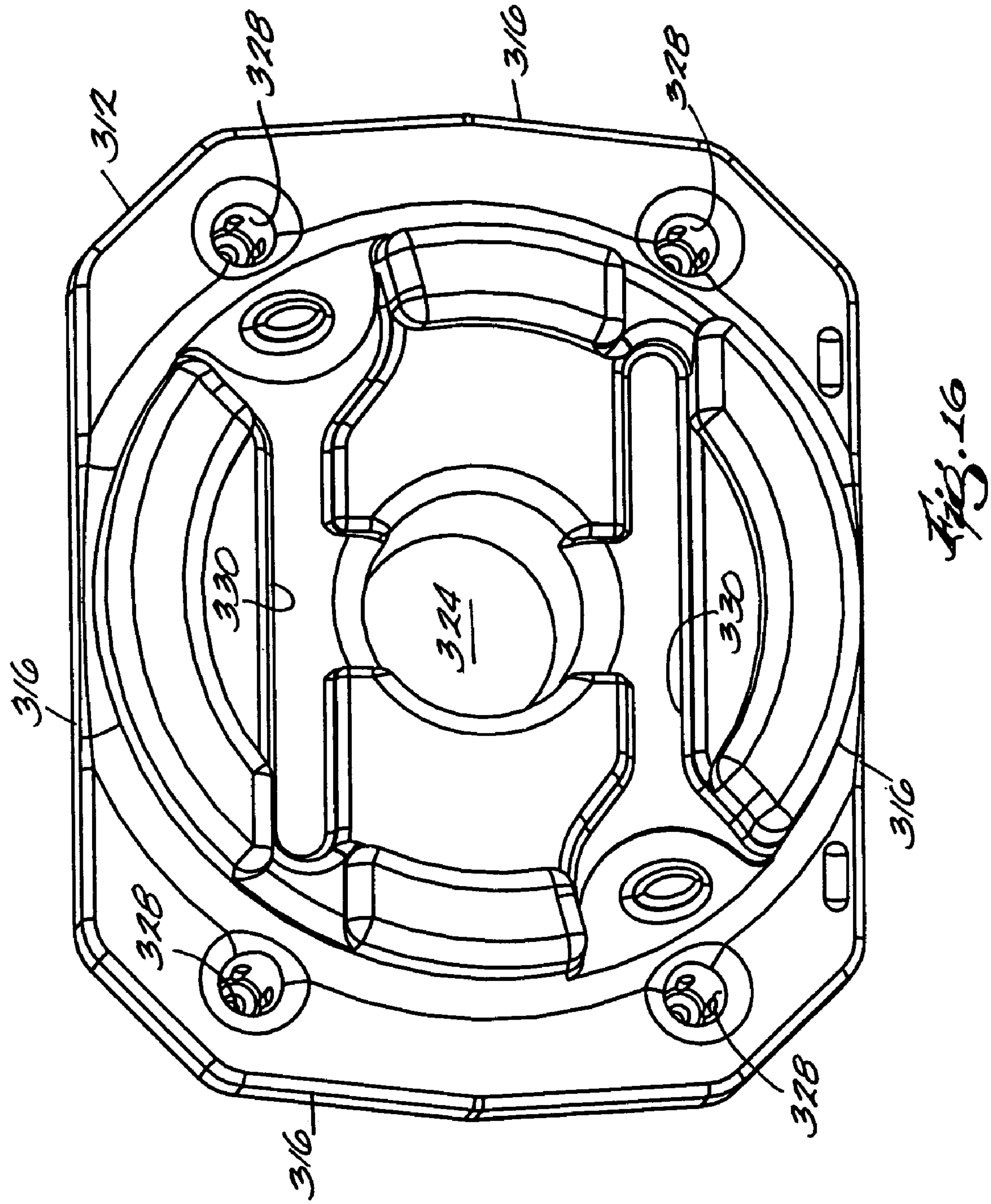
FIG. 16 is a perspective view of the base plate.
Figure 17:
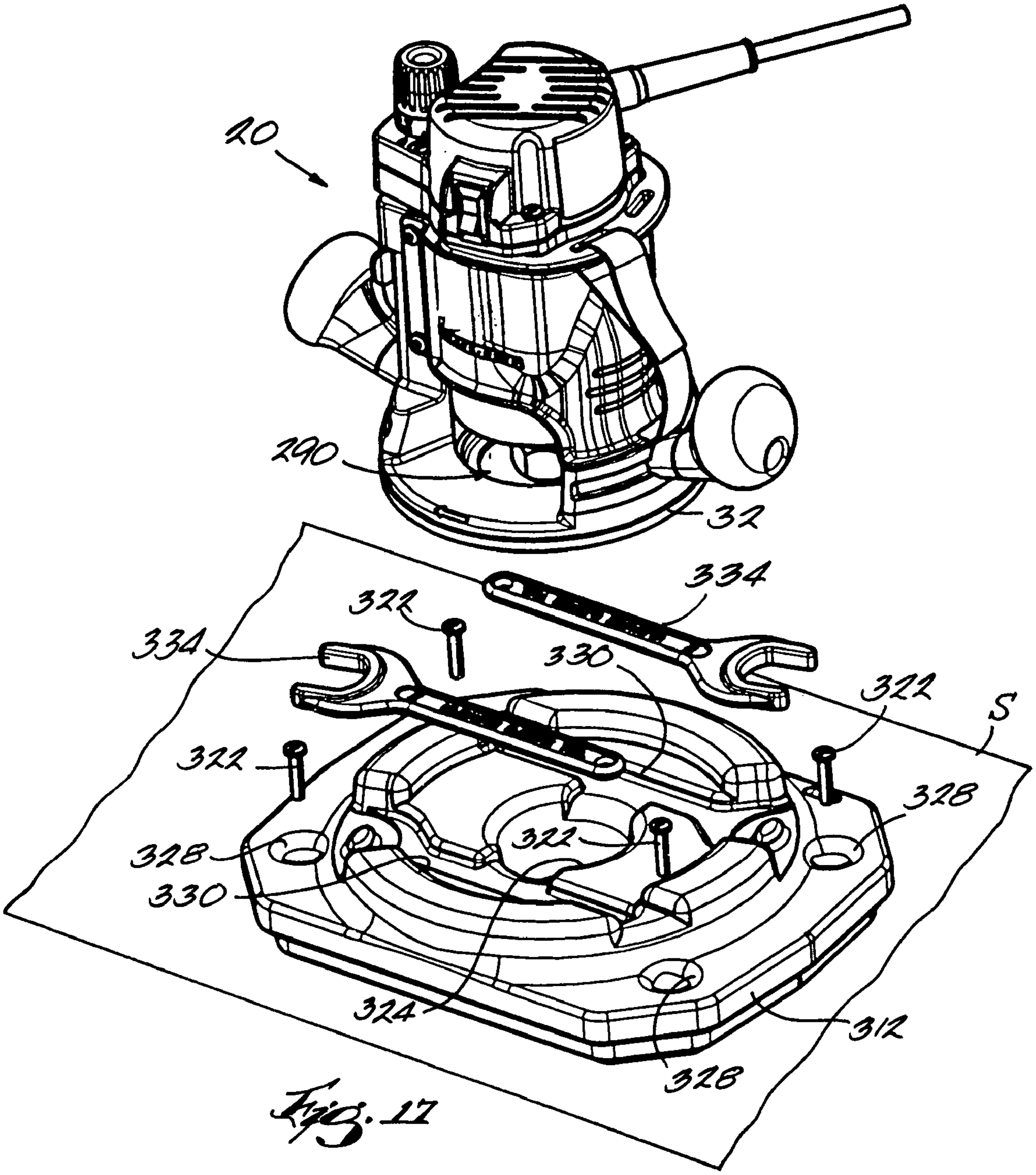
FIGS. 17–19 are perspective views of the base plate and the router and illustrating installation of the base plate on a support surface.
Figure 18:
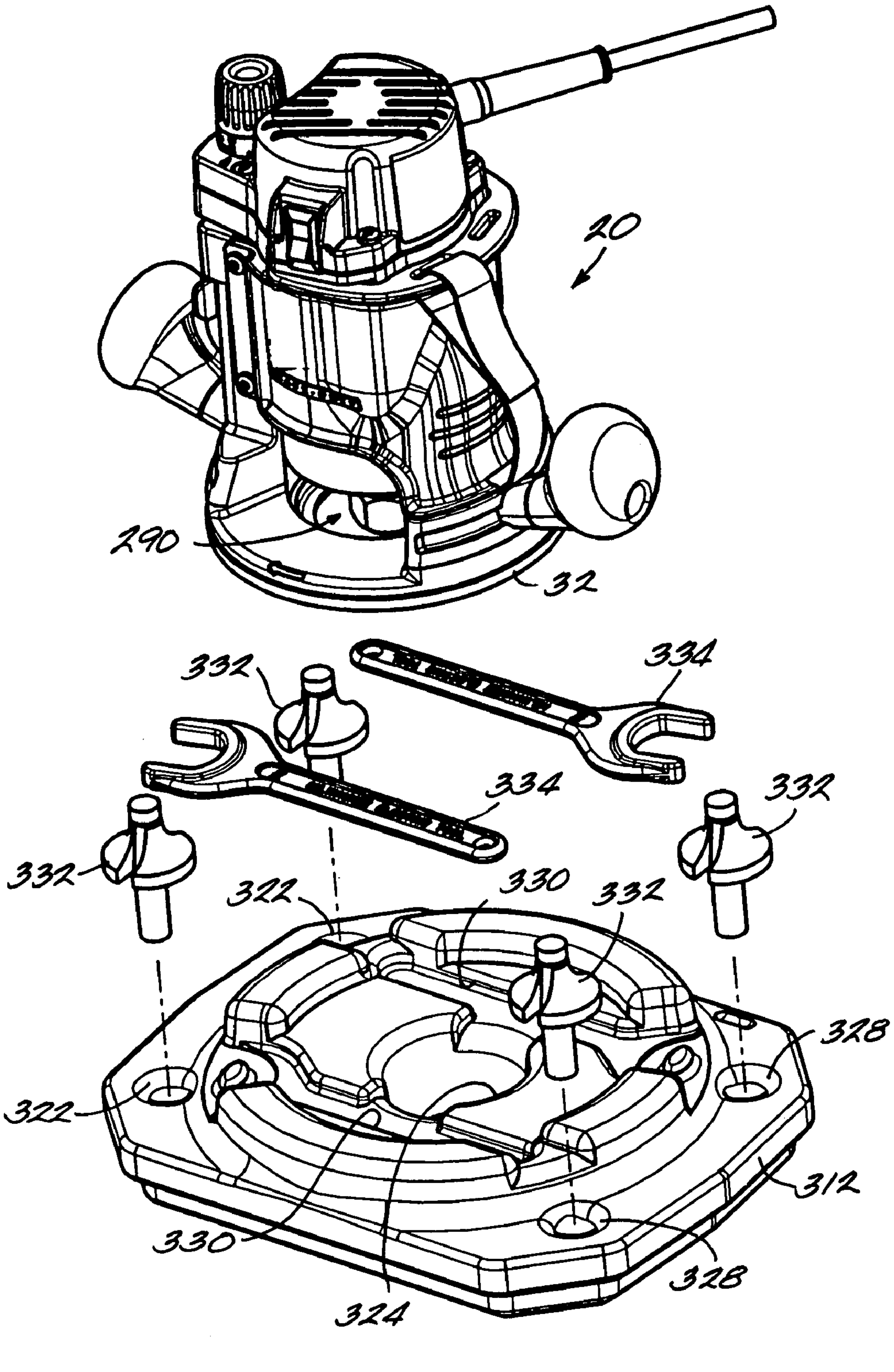
Figure 19:
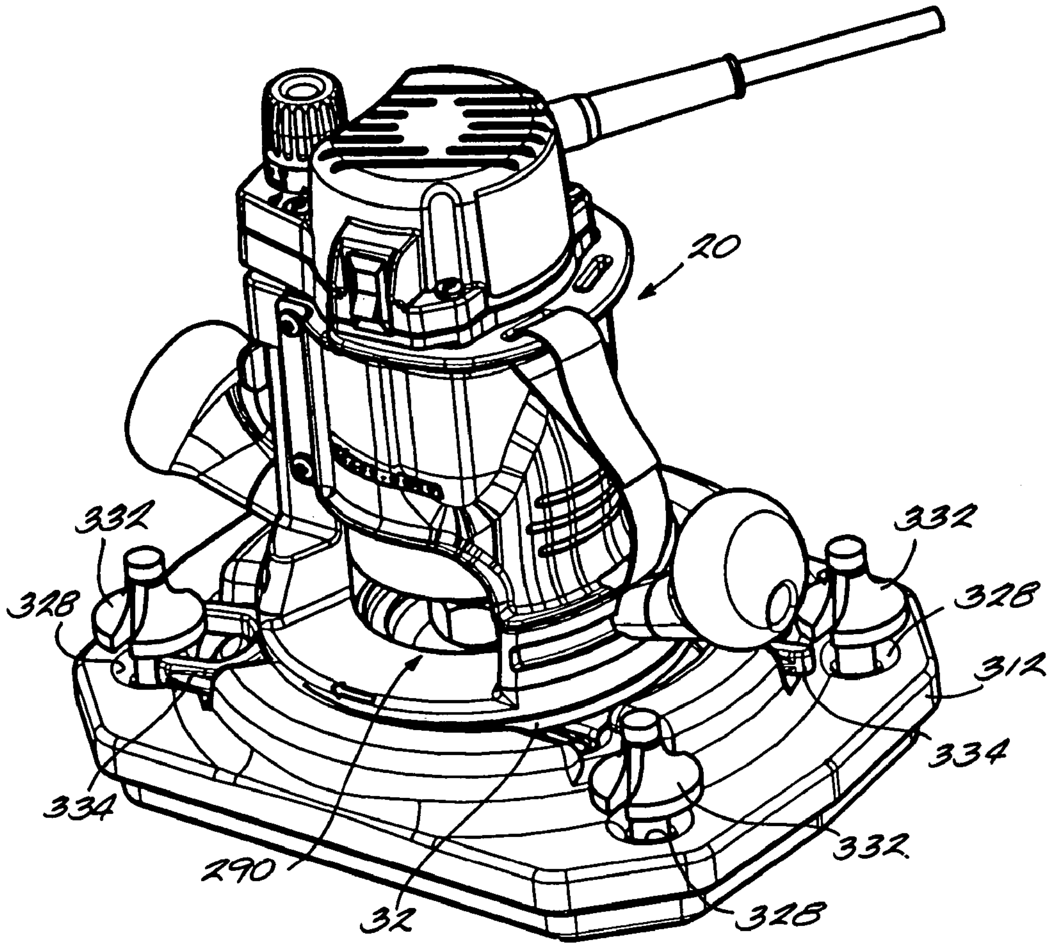

As shown in FIG. 13, the router 20 can be supported in an inverted position below a support member, such as a table 280. The table 280 has an upper surface for supporting a workpiece (not shown) and a lower surface to which the router 20 is connected. First and second apertures or openings 284 and 288 extend through the table 20. The first aperture 284 allows a tool element or cutting bit 290 of the router 20 to protrude above the table 280 so work can be done on the workpiece.

An adjustment member 292 is inserted into the second aperture 288 of the table 280 to facilitate adjustment of the cutting depth of the router 20 from above the table 280. The adjustment member 292 has a knob 294 engageable by an operator and a second end 296 engaging the lower end 238 of the depth adjustment shaft 228. The ends 296 and 238 have complementary engaging surfaces to rotatably connect the adjustment member 292 and the depth adjustment shaft 228. As the adjustment member 292 is rotated, the depth adjustment shaft 228 rotates, thereby adjusting the height of the cutting bit 290 above the table 280. The adjustment member 292 alleviates the need to reach under the table to make fine height adjustments to the depth of cut of the router 20.

As shown in FIGS. 14–19, the router 20 may be used in combination with a router case 300. The case 300 includes (see FIGS. 14–15) hinged case walls 304 and 308 defining grooves 310 and a removable base plate 312 cooperating to define an interior 314 in which the router 20 may be positioned. In the illustrated construction, the lateral edges 316 of the base plate 312 are slidably received in the grooves 310 to connect the base plate 312 to the case walls 304 and 308. However, in other constructions (not shown), the base plate 312 may be connected to the case walls 304 and 308 in another manner, such as, for example, by fasteners (not shown). Preferably, the case 300 is molded or formed of a suitable material to provide the necessary configuration to accommodate the router 20 and any accessories. The case 300 also includes a carrying handle 320.

As shown in FIGS. 14–19, the base plate 312 may be removed from the case 300 and may be connected by fasteners 322 to a surface S to support the router 20 on the surface S. The base plate 312 has an upper surface defining a central recess 324. The router 20 is supported with the lower surface of the base plate 32 engaging a portion of the upper surface of the base plate 312 and with the cutting bit 290 received in the central recess 324. The router 20 can thus be conveniently stored in a work area ready-for-use with the cutting bit 290 still attached. The base plate 312 defines additional recessed areas 328 and 330 for conveniently storing additional cutting bits 332 and tools, such as wrenches 334, respectively. In the illustrated construction, the fasteners 322 extend through the additional recessed areas 328 to connect the base plate 312 to the surface S.

One or more independent features of the invention are set forth in the following claims.

We claim:

1. A router supportable by a support member, the support member having a top surface on which a workpiece is supportable, the router being supportable below the support member on an underside of the support member, the router comprising:

a base engageable with the support member below the support member and having a base aperture defined therethrough;

a motor housing movably supported by the base;

a motor supported by the motor housing and operable to drive a tool element;

an adjustment mechanism supported by at least one of the base and the motor housing for adjusting a position of the motor housing relative to the base and for adjusting a depth of cut of the tool element, the adjustment mechanism having a first shaft connected to one of the base and the motor housing and rotatable about an axis, the first shaft having a first portion engageable by an operator to rotate the shaft and a second portion aligned with the base aperture and positioned above the first portion when the router is supported below the support member, the adjustment mechanism also having an actuator and a position indication ring, the actuator being couplable to the first portion and rotatable relative to the housing to allow an operator to manually rotate the first shaft, the position indication ring being couplable to the first portion, surrounding the first shaft, and including a plurality of position indicating markings for indicating depth adjustment positions; and a second shaft having an actuator portion engageable by an operator and an engaging portion engageable with the second portion of the first shaft, the engaging portion being insertable through the base aperture from above the underside of the support member to engage the second portion of the first shaft.

2. The router of claim 1, wherein the second portion of the first shaft has a configuration, and wherein the engaging portion of the second shaft has a configuration complementary to the configuration of the second portion of the first shaft.

3. The router of claim 1, wherein the second portion of the first shaft has a surface, and wherein the engaging portion of the second shaft has a surface complementary to the surface of the second portion of the first shaft.

4. The router of claim 1, wherein the second portion of the first shaft has a polygonal surface, and wherein the engaging portion of the second shaft has a polygonal surface complementary to the polygonal surface of the second portion of the first shaft.

5. The router of claim 1, wherein the second portion of the first shaft has a hexagonal surface, and wherein the engaging portion of the second shaft has a hexagonal surface complementary to the hexagonal surface of the second portion of the first shaft.

6. The router of claim 1, wherein the actuator is an adjustment knob.

7. The router of claim 1, further comprising an adjustment column at least partially defined by and integrally formed with at least one of the base and the motor housing, the adjustment column being aligned with the base aperture.

8. The router of claim 7, wherein the adjustment column is defined by the base.

9. The router of claim 7, wherein at least a portion of the first shaft is positioned in the adjustment column.

10. The router of claim 9, wherein the second portion of the first shaft is positioned in the adjustment column.

11. A combination comprising:
- a support member having an upper surface for supporting a workpiece and a lower surface; and
- a router including
  - a base having a base plate and a base aperture defined in the base,
  - a motor housing supported by the base,
  - a motor supported by the motor housing and operable to drive a tool element,
  - an adjustment mechanism supported by at least one of the base and the motor housing for adjusting the position of the motor housing relative to the base and for adjusting the depth of cut of the tool element, the adjustment mechanism including a first shaft connected to one of the base and the motor housing, rotatable about an axis, and aligned with the base aperture, the first shaft having a first portion engageable by an operator to rotate the first shaft and a second portion displaced from the base plate, and
  - a second shaft having an actuator portion engageable by an operator and an engaging portion;
- wherein the combination has a first orientation in which the router is supported on the workpiece, the workpiece being supported on the upper surface, and a second orientation in which the router is supported below the lower surface of the support member and the first portion of the first shaft is positioned below the base plate, the second portion of the first shaft is positioned between the first portion and the base plate, and the second portion is displaced below the base plate, the support member defining a first aperture from the upper surface to the lower surface through which the tool element is insertable to engage the workpiece and defining a second aperture from the upper surface to the lower surface aligned with the base aperture, the engaging portion of the second shaft being insertable through the second aperture and the base aperture to engage the second portion of the first shaft at a position displaced below the base plate.

12. The combination of claim 11, wherein the second portion of the first shaft has a configuration, and wherein the engaging portion of the second shaft has a configuration complementary to the configuration of the second portion of the first shaft.

13. The combination of claim 11, wherein the second portion of the first shaft has a polygonal surface, and wherein the engaging portion of the second shaft has a polygonal surface complementary to the polygonal surface of the second portion of the first shaft.

14. The combination of claim 11, further comprising an actuator coupled to the first portion of the first shaft and rotatable relative to the housing to allow an operator to manually rotate the first shaft.

15. The combination of claim 14, wherein the actuator is an adjustment knob.

16. The combination of claim 11, further comprising an adjustment column at least partially defined by and integrally formed with at least one of the base and the motor housing, the adjustment column being aligned with the base aperture.

17. The combination of claim 16, wherein the adjustment column is defined by the base.

18. The combination of claim 11, wherein at least a portion of the first shaft is positioned in the adjustment column.

19. The combination of claim 11, wherein the second portion of the first shaft is positioned in the column.

20. The combination of claim 11, wherein the router is supported on the lower surface of the support member.

21. The combination of claim 11, wherein the base is supported on the lower surface of the support member.

22. The combination of claim 11, wherein the router is a fixed base router.

23. A method of manufacturing a router, the method comprising the acts of:
- providing a base defining a base aperture therethrough;
- providing a motor housing;
- providing a motor operable to drive a tool element;
- providing an adjustment mechanism for adjusting the position of the motor housing relative to the base and for adjusting the depth of cut of the tool element, the adjustment mechanism including a first shaft and a second shaft, the first shaft being rotatable about an axis and aligned with the base aperture, the first shaft having a first portion engageable by an operator to rotate the first shaft and a second portion, the adjustment mechanism also having an actuator and a position indication ring, the actuator being couplable to the first portion and rotatable relative to the housing to allow an operator to manually rotate the first shaft, the position indication ring being couplable to the first portion, surrounding the first shaft, and including a plurality of position indicating markings for indicating depth adjustment positions, the second shaft having an actuator portion engageable by an operator and an engaging portion engageable with the second portion of the first shaft;
- connecting the motor to the motor housing;
- connecting the motor housing to the base such that the motor housing is movable relative to the base; and
- connecting the adjustment mechanism to at least one of the base and the motor housing such that the motor housing is adjustably movable relative to the base.

24. The method of claim 23, further comprising the acts of:
- providing a support member;
- supporting the router below the support member; and
- engaging the engaging portion of the second shaft with the second portion of the first shaft.

25. The method of claim 23, wherein the router is a fixed base router.

26. The method of claim 23, further comprising the acts of providing an adjustment column at least partially defined by and integrally formed with at least one of the base and the motor housing, the adjustment column being aligned with the base aperture.

27. The method of claim 26, wherein the act of providing an adjustment column includes the act of providing an adjustment column defined by the base.

28. The method of claim 26, further comprising the act of positioning at least a portion of the first shaft in the adjustment column.

29. The method of claim 28, wherein the act of positioning at least a portion of the first shaft in the adjustment column includes the act of positioning the second portion of the first shaft in the adjustment column.

30. A method of operating a router, the method comprising the acts of:
- providing a router including a base defining a base aperture, a motor housing supported by the base, a motor supported by the motor housing and operable to drive a tool element, and an adjustment mechanism for adjusting the position of the motor housing relative to the base and for adjusting the cutting depth of the tool element, the adjustment mechanism including a first shaft connected to one of the base and the motor housing, rotatable about an axis, and aligned with the base aperture, the first shaft having a first portion and a second portion, the adjustment mechanism including a second shaft having an actuator portion and an engaging portion; and performing one of a first depth adjusting act and a second depth adjusting act to adjust a cutting depth of the tool element, the first depth adjusting act including rotating the first portion of the first shaft in one of a first direction to increase the cutting depth of the tool element and a second direction to decrease the cutting depth of the tool element;

the second adjusting act including the acts of grasping the actuator portion of the second shaft, inserting the engaging portion of the second shaft into the base aperture, engaging the second portion of the first shaft with the engaging portion of the second shaft, and rotating the second portion of the first shaft with the second shaft in one of the first direction to increase the cutting depth of the tool element and the second direction to decrease the cutting depth of the tool element, the second portion moving vertically relative to the base when the second portion is rotated in both the first direction and the second direction.

31. The method of claim 30, further comprising providing an adjustment knob coupled to the first portion of the first shaft.

32. The method of claim 31, wherein the first adjusting act includes the act of rotating the adjustment knob in one of the first direction and the second direction.

* * * * *